July 29, 1969  K. K. K. KRØYER  3,458,331
METHOD OF MANUFACTURING RELATIVELY HIGH
CALCIA-SILICA CERAMIC MATERIALS
Filed Feb. 24, 1965
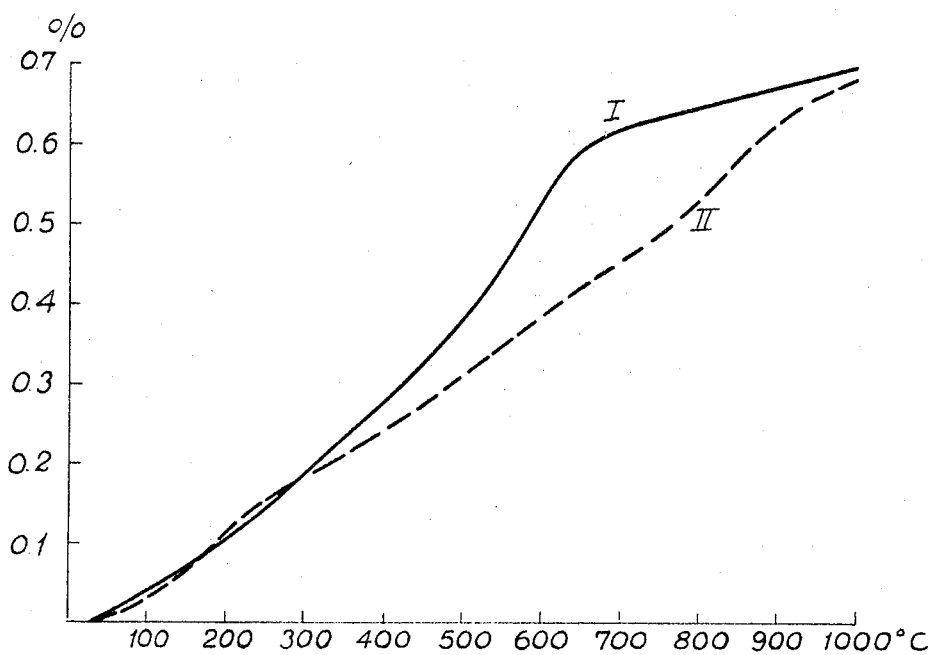
INVENTOR:
KARL K. K. KRØYER
ATTORNEYS United States Patent Office 3,458,331
Patented July 29, 1969

3,458,331
METHOD OF MANUFACTURING RELATIVELY
HIGH CALCIA-SILICA CERAMIC MATERIALS
Karl Kristian Kobs Kroyer, 80 Vestre Kongevej,
Viby, near Aarhus, Denmark
Filed Feb. 24, 1965, Ser. No. 434,890
Claims priority, application Denmark, Feb. 28, 1964,
996/64
Int. Cl. C04b 33/24, 33/04
U.S. Cl. 106—45                                    6 Claims

ABSTRACT OF THE DISCLOSURE

A method for manufacturing ceramic materials which comprises mixing together and firing at least one inorganic plastic material such as clay and kaolin and at least one inorganic nonplastic material which comprises a crystallized vitreous material produced by melting together at least 60% $SiO_2$ and at least 20% CaO, the remainder being elemental oxide of a kind used for glass manufacture, and products produced thereby.

The present invention relates to a method of manufacturing ceramic materials of the kind for which, in addition to a plastic material, one or more non-plastic materials are used.

Heavy drawbacks and inconveniences are involved by the manufacture of ceramic materials of the said kind, for which the non-plastic materials used are minerals containing free silica ($SiO_2$). The fact is that free silica is the cause of silicosis and consequently dangerous to health, and in addition it involves technical drawbacks primarily associated with the many different forms of crystals in which $SiO_2$ is available at different temperatures and which have widely varying coefficients of thermal expansion.

The free silica is, however, difficult to substitute, not only because it is a widely available and cheap mineral which, for example, in the form of quartz, flint and sand has been used in the ceramic industry for a long time past, but also because there is a need for utilising the high thermal expansion coefficient of the silica, in particular, where the manufacture of glazed ceramic materials are involved, in which it is important that the body is subject to a heat expansion greater than that of the glazing.

It has now been found that the aforesaid drawbacks and inconveniences in the manufacture of ceramic materials may be avoided by substituting the free silica used for such manufacture by a crystallised, vitreous material manufactured by melting together at least 60% $SiO_2$ and at least 20% CaO, the remainder being other metal oxides of the kind used for glass manufacture.

Such a material and its manufacture is, for example, described in the British patent specifications Nos. 795,-787 and 897,125 and has been used in the form of a granular aggregate for the manufacture of bright road surfaces, since the material is white and has lost its characteristic of glass. Owing to this characteristic there is no colour problem, and the material is thus suitable both for the manufacture of coarse ceramic materials and ceramic materials with a white body. The material has furthermore a high, but uniform coefficient of thermal expansion.

The invention is thus concerned with a method of manufacturing ceramic materials of the kind in which, in addition to a plastic material, one or more non-plastic materials are used, and the essential feature of the said method is that the non-plastic material used is wholly or partly a crystallised, vitreous material obtained by melting together at least 60% $SiO_2$ and at least 20% CaO, the remainder being other metal oxides of the kind used for glass manufacture.

The crystallised, vitreous material used according to the invention is preferably a material produced by melting together sand, lime and dolomite and showing approximately the following analysis:

|  | Percent |
| --- | --- |
| $SiO_2$ | 68 |
| CaO | 25 |
| MgO | 3 |
| $Al_2O_3$ | 3 |
| $Fe_2O_3$ | $<\frac{1}{2}$ |
| $K_2+Na_2O$ | $<\frac{1}{2}$ |

A material of this composition is very readily caused to crystallise.

The said crystallised, vitreous material gives a ceramic material with the same thermal expansion as a corresponding material in which the non-plastic constituent used is free silica, but the curve of the thermal expansion has a more rectilinear course owing to the crystallisation that has taken place already. This condition is illustrated in drawings showing two curves of the thermal expansion in percentage as a function of the temperature in centigrade for two ceramic materials, that is, 50% ball clay+50% fllint (curve No. I) and 50% ball clay+50% crystallised vitreous material (curve No. II), respectively. The vitreous material was of the aforesaid preferred composition.

The physical properties of these two ceramic materials after firing at 1150° C. are shown in the table below:

| Composition | Breaking strength, kg./sq./cm. | Apparent porosity, percent |
| --- | --- | --- |
| 50% flint plus 50% ball clay | 222.5 | 22.5 |
| 50% vitreous material plus 50% ball clay | 375.0 | 8.1 |

The crystallised, vitreous material may owing to its white colour be used for the manufacture of ceramic materials with white body such as porcelain and stoneware, provided only that care is taken to ensure that the firing takes place under such conditions that the crystallised state is maintained, that is, that the firing does not take place at such high temperature as to cause melting of the crystals, or that the cooling is so slow that the material re-crystallises if it has been molten, and these requirements are generally satisfied in the manufacture of porcelain on an industrial scale.

To illustrate the effect exercised by the crystallised, vitreous material in porcelain masses, the following tests were carried out:

Four porcelain masses were produced, the first one being a control mass of conventional composition, that is, 50% kaolin, 25% quartz and 25% felspar, the remaining three having the following compositions:

(1)

| | Percent |
|---|---|
| Kaolin | 50 |
| Crystallised vitreous material | 40 |
| Felspar | 10 |

(2)

| | Percent |
|---|---|
| Kaolin | 50 |
| Crystallised vitreous material | 35 |
| Felspar | 15 |

(3)

| | Percent |
|---|---|
| Kaolin | 50 |
| Crystallised vitreous material | 30 |
| Felspar | 20 |

All the materials were of a grain size less than 75μ.

The four different masses were used for making a wet cylindrical test specimens, 12 mm. in diameter and 3 cm. high. These test specimens were at first dried for 4 hours at room temperature, and then for 8–9 hours in a heated cabinet at 130° C. and finally fired at temperatures up to 1450° C.

For all of the three test masses the optimal firing temperature was found to be within the low temperature range of 1300–1350° C., whereas the optimal firing temperature of the control mass was of about 1425° C.

All the test specimens fired at optimal firing temperature had similarly as the control test specimens a dense, dull, white body without apparent porosity, but the three test specimens produced by the method according to the invention had an impact resistance greater than that of the control element, composition No. 3 having the greatest resistance.

The mechanical properties of ceramic materials manufactured by the method according to the invention seem thus to be satisfactory, and preliminary tests seem to indicate that the electrical properties are good too.

As will appear from the test described above, the crystallised vitreous material has the effect of a fluxing agent when compared with quartz alone, and the method according to the invention may therefore advantageously be carried out by using the vitreous material instead of both free silica and non-plastic, mineral fluxing agents.

What I claim and desire to secure by Letters Patent is:

1. In the method of manufacturing ceramic materials which contain in addition to an inorganic plastic material at least one inorganic non-plastic material, the improvement which comprises mixing together and firing the inorganic plastic material and an inorganic non-plastic material comprising a crystallized vitreous material produced by melting together at least 60% $SiO_2$ and at least 20% CaO, the remainder being other metal oxides of the kind used for glass manufacture.

2. A method as claimed in claim 1, characterized in that use is made of a crystallised, glassy material produced by melting together sand, lime and dolomite and showing approximately the following analysis:

| | Percent |
|---|---|
| $SiO_2$ | 68 |
| CaO | 25 |
| MgO | 3 |
| $Al_2O_3$ | 3 |
| $Fe_2O_3$ | <½ |
| $K_2O+Na_2O$ | <½ |

3. A method of manufacturing ceramic materials which comprise at least one inorganic plastic material and at least one inorganic non-plastic material, which comprises forming an inorganic non-plastic material by melting together at least 60% $SiO_2$ and at least 20% CaO, the remainder being other metal oxides of the kind used for glass manufacture to form a vitreous material, crystallizing the vitreous material to obtain a crystallized vitreous material, mixing the crystallized vitreous material thus formed with an inorganic plastic material and firing the mixture at an elevated temperature to produce a ceramic of low porosity and relatively high strength under conditions such that the crystallized state of the crystallized vitreous material is not impaired.

4. A method as set forth in claim 3 wherein the crystallized vitreous material is present in an amount of 50% by weight of the total composition.

5. A method as set forth in claim 3 wherein the crystallized vitreous material is present in an amount ranging from 30% to 50% by weight.

6. A ceramic article made by the method as set forth in claim 3.

References Cited

UNITED STATES PATENTS

| 2,910,760 | 11/1959 | Jackson | 106—63 X |
| 2,177,046 | 10/1939 | Sweo | 106—45 X |
| 3,073,708 | 1/1963 | Kroyer | 106—39 X |

OTHER REFERENCES

Kingery, W. D., Introduction to Ceramics, New York, John Wiley & Sons, Inc., 1960, pp. 466, 468, and 481.

HELEN M. McCARTHY, Primary Examiner

W. R. SATTERFIELD, Assistant Examiner

U.S. Cl. X.R.

106—39, 63, 67